Nov. 24, 1925.

I. M. PETERSIME

INCUBATOR

Filed May 22, 1923     3 Sheets-Sheet 1

1,562,787

Inventor

Ira M. Petersime

Nov. 24, 1925.

I. M. PETERSIME

INCUBATOR

Filed May 22, 1923

Inventor

Ira M. Petersime

Nov. 24, 1925.  
I. M. PETERSIME  
INCUBATOR  
Filed May 22, 1923 — 3 Sheets-Sheet 3

1,562,787

Inventor  
Ira M. Petersime

Patented Nov. 24, 1925.

1,562,787

UNITED STATES PATENT OFFICE.

IRA M. PETERSIME, OF GETTYSBURG, OHIO.

INCUBATOR.

Application filed May 22, 1923. Serial No. 640,736.

*To all whom it may concern:*

Be it known that I, IRA M. PETERSIME, a citizen of the United States, residing at Gettysburg, in the county of Darke and State of Ohio, have invented certain new and useful Improvements in an Incubator, of which the following is a specification.

This invention relates to mechanically operated incubators and more particularly to an improved device for containing incubator eggs and adapted to be operated by mechanical means whereby the eggs, during their preliminary period of incubation, will be turned and thereby subjected to an even temperature.

One of the objects of the invention is to provide a device of this character which may be heated by any suitable heating medium and which will be arranged to contain a quantity of eggs which can be slowly revolved within the cabinet, so that all of the eggs will be subjected to substantially the same conditions whereby greater efficiency will result.

A further object is the provision of a rotatable drum, and an agitator element having blades adapted to pass around the exterior of said drum to keep the air in motion and of the same temperature throughout the machine.

Other objects of the invention will appear upon consideration of the following detailed description and the accompanying drawings, in which.

Figure 1:
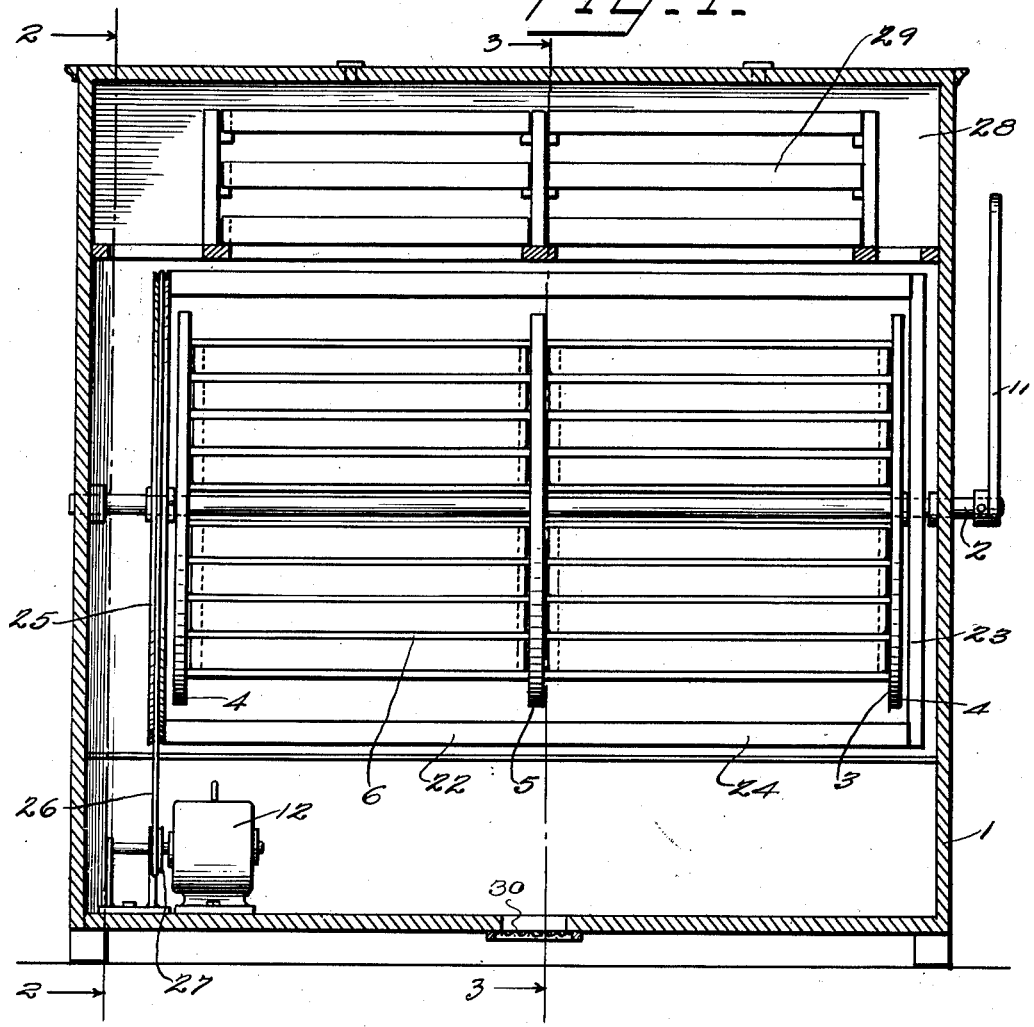
Figure 1 is a vertical-longitudinal section through the device constructed in accordance with my invention.
Figure 2:
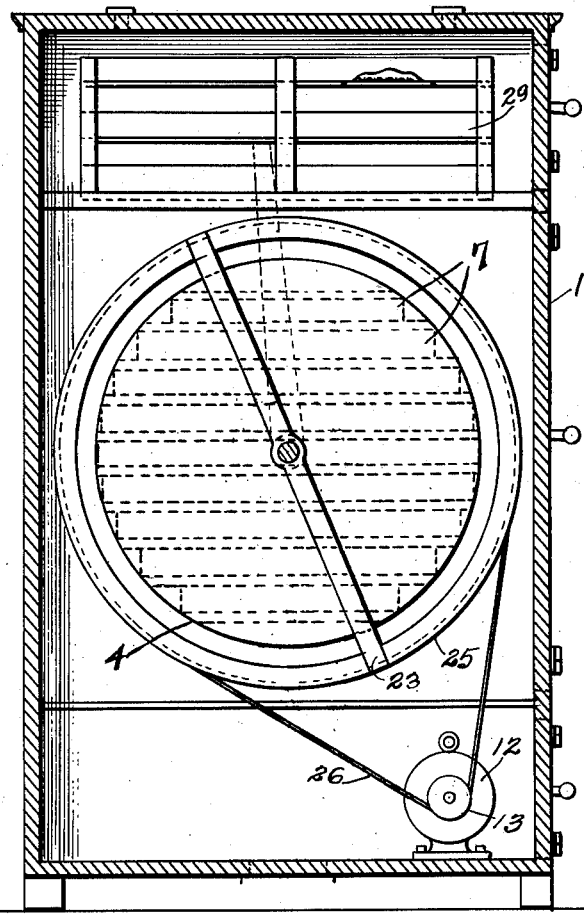
Figure 2 is a transverse vertical section taken on the line 2—2 of Figure 1.
Figure 6:
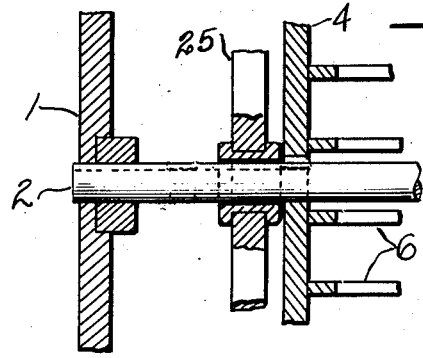
Figure 6 is a detailed section through a portion of the mechanism.
Figure 3:
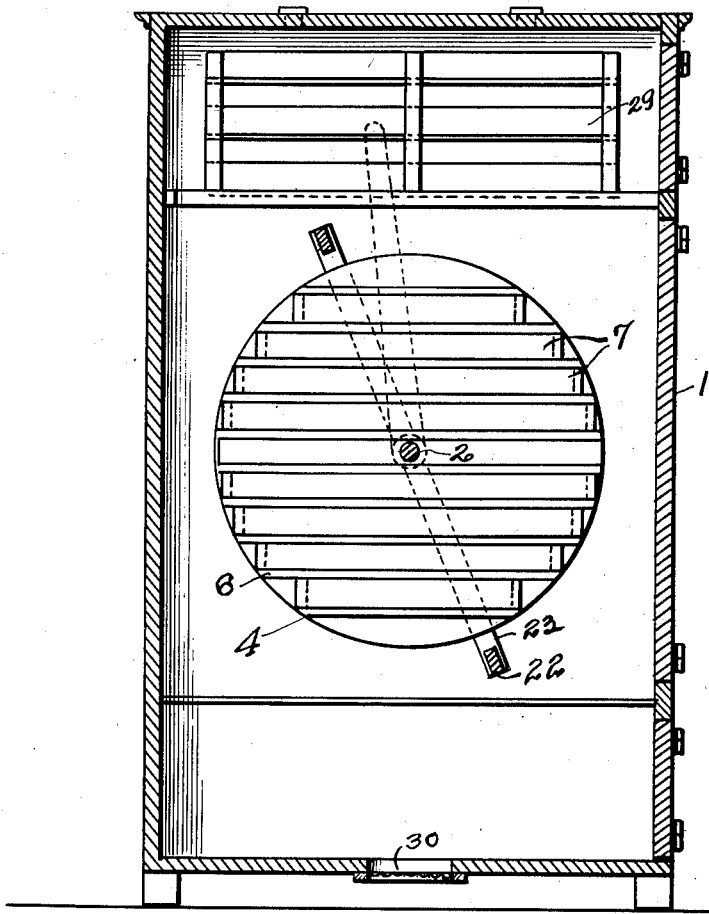
Figure 3 is a vertical-transverse section taken approximately on the line 3—3 of Figure 1.
Figure 5:
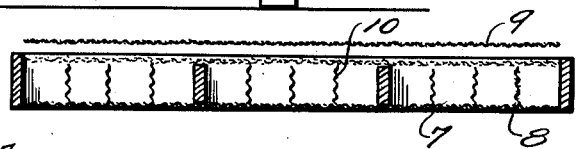
Figure 5 is a cross section taken on line 5—5 of Figure 4.
Figure 4:
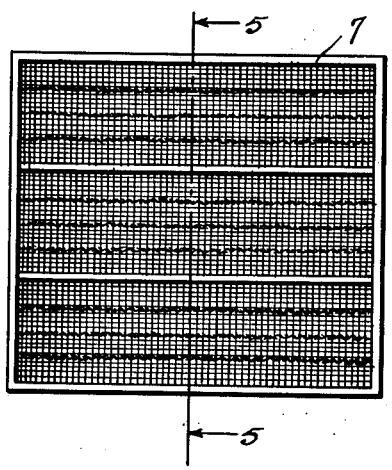
Figure 4 is a plan view of one of the egg trays.

Referring to the drawings by numerals, the cabinet 1 may be of any size or shape and is preferably provided with doors whereby access may be readily had to the interior. The cabinet is provided with a longitudinally extending shaft 2 having bearings in opposite walls of the cabinet, and this shaft is provided with a drum 3 for carrying the egg tray. The drum 3 consists of the end disc 4 and the central disc 5, which are attached to the shaft 2, and these discs are connected to the ends of the dividing partitions 6 which are spaced apart to form the spaces which provide the compartments to receive the egg trays 7. The trays are held between the partitions 6 by any improved means (not shown). The egg trays are of various sizes according to their position in the drum 3, and consist of a substantially rectangular shallow tray provided with a screen bottom 8 and a top screen cover 9 and transverse screen partitions 10 between which the eggs are placed so that they will be held in their proper position and be held against displacement when the drum is rotated.

The trays are inserted into the compartment in the drum through either side of the drum and, of course, each tray will be filled with eggs before it is placed in the machine. A handle or lever 11 on the end of the shaft 2 permits the shaft to be rotated by hand.

It will be understood that a suitable source of heat supply will be provided, such as an electric heater, gas or oil lamp, and material will also be supplied to the cabinet to maintain the proper humidity, as is well known in the art. To keep the moisture agitated, however, as is well known in the art, an agitator 22 is provided which consists of the cross arms 23 on the shaft 2 at opposite ends of the drum, and these cross arms are provided with the blades 24 which rotate around the drum when the agitator is operated. One end of the agitator is provided with a relatively large pulley 25 over which is trained a cable 26 which passes over a pulley 27 on the shaft of the motor. The different sizes of the pulleys, of course, will cause the agitator to turn at the desired speed so that the moisture will be thoroughly agitated during the time the apparatus is in use. Above the drum section of the cabinet, is a top compartment 28 within which the stationary trays 29 are located, as it has been found that in the use of this device only during the first 18 days should the eggs be kept in motion. At the expiration of that time the trays should be removed and placed in the top compartment for hatching. At the bottom of the compartment 1 is shown an opening 30 to permit a heater or the like to be inserted.

Minor changes may be made in the details of construction without departing from the spirit of the invention or the scope of the claims hereunto appended.

What I claim is:

1. An incubator comprising a cabinet, a shaft mounted in the cabinet, a drum mounted upon the said shaft for rotation thereon, a plurality of egg trays carried by the said drum and adapted to rotate therewith, an agitator element having blades adapted to pass around the exterior of the said drum, and means to actuate the said agitator element.

2. An incubator of the character described comprising a cabinet, a member arranged in said cabinet for supporting eggs in said cabinet, and an agitator element arranged in said cabinet and adapted to pass around the exterior of said egg supporting member.

3. An incubator comprising a cabinet, a shaft mounted in the cabinet, a drum mounted upon said shaft, a pair of members pivotally mounted on said shaft one at each end of said drum, a series of blades having their ends attached to said pivotally mounted members so that said members and blades will rotate together to form an agitator, and means engaging one of said pivotally mounted members to rotate the entire agitator.

4. An incubator including a heated cabinet equipped with egg holding means, and an agitator traveling around said means to maintain a uniform temperature in all parts of the cabinet.

5. An incubator including a heated cabinet equipped with egg supports, and means movable around the supports to maintain a uniform temperature around all of the supports.

6. An incubator including a heated egg containing cabinet, and an air agitator constantly traveling around the eggs in said cabinet.

In testimony whereof, I have affixed my signature.

IRA M. PETERSIME.